United States Patent
Ma et al.

(10) Patent No.: US 12,356,052 B2
(45) Date of Patent: Jul. 8, 2025

(54) VIDEO IMAGE TRANSMISSION METHOD, DEVICE AND SYSTEM

(71) Applicant: BOE TECHNOLOGY GROUP CO., LTD., Beijing (CN)

(72) Inventors: Xiaohui Ma, Beijing (CN); Youxue Wang, Beijing (CN); Kai Geng, Beijing (CN); Liye Duan, Beijing (CN); Da Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 96 days.

(21) Appl. No.: 17/773,116

(22) PCT Filed: Jun. 18, 2021

(86) PCT No.: PCT/CN2021/100977
§ 371 (c)(1),
(2) Date: Apr. 29, 2022

(87) PCT Pub. No.: WO2021/254494
PCT Pub. Date: Dec. 23, 2021

(65) Prior Publication Data
US 2024/0187704 A1    Jun. 6, 2024

(30) Foreign Application Priority Data
Jun. 19, 2020   (CN) .......................... 202010566292.0

(51) Int. Cl.
  *H04N 21/647* (2011.01)
  *H04N 21/2343* (2011.01)
  *H04N 21/2743* (2011.01)
(52) U.S. Cl.
  CPC .............. *H04N 21/64769* (2013.01); *H04N 21/234381* (2013.01); *H04N 21/2743* (2013.01)

(58) Field of Classification Search
None
See application file for complete search history.

(56) References Cited

U.S. PATENT DOCUMENTS

| | | |
|---|---|---|
| 2012/0314759 A1 | 12/2012 | Huang et al. |
| 2017/0289006 A1 | 10/2017 | Sato et al. |
| 2018/0359413 A1 | 12/2018 | Wu et al. |

FOREIGN PATENT DOCUMENTS

| | | |
|---|---|---|
| CN | 101198042 A | 6/2008 |
| CN | 103607559 A | 2/2014 |

(Continued)

OTHER PUBLICATIONS

China Patent Office, First Office Action issued Apr. 8, 2022 for application No. CN202010566292.0.

(Continued)

*Primary Examiner* — Omar S Parra
(74) *Attorney, Agent, or Firm* — HOUTTEMAN LAW LLC

(57) ABSTRACT

The disclosure provides a video image transmission method, including: capturing and uploading video images to a cloud server in real time, by a video image capture terminal; acquiring first speed information of uploading the video images by the video image capture terminal and second speed information of receiving the video images by the cloud server; determining, according to first speed information, second speed information and a current ratio n of a first frame rate at which the video image capture terminal captures the video images and a second frame rate at which the video image capture terminal uploads the video images, a target ratio m of the first frame rate to the second frame rate, the target ratio m and the current ratio n being both positive integers; and adjusting, according to the target ratio m, a speed at which the video image capture terminal uploads the video images, to match an adjusted speed at which the video (Continued)

image capture terminal uploads the video images with a speed at which the cloud server receives the video images.

20 Claims, 4 Drawing Sheets

(56) References Cited

FOREIGN PATENT DOCUMENTS

| | | | |
|---|---|---|---|
| CN | 105430532 | A | 3/2016 |
| CN | 105656602 | A | 6/2016 |
| CN | 106911432 | A | 6/2017 |
| CN | 108924640 | A | 11/2018 |
| CN | 108989832 | A | 12/2018 |
| CN | 109587510 | A | 4/2019 |
| CN | 109729439 | A | 5/2019 |
| CN | 110557647 | A | 12/2019 |
| CN | 111107440 | A | 5/2020 |

OTHER PUBLICATIONS

China Patent Office, Second Office Action issued Aug. 31, 2022 for application No. CN202010566292.0.

VIDEO IMAGE TRANSMISSION METHOD, DEVICE AND SYSTEM

CROSS-REFERENCE TO RELATED APPLICATION

This is a National Phase Application filed under 35 U.S.C. 371 as a national stage of PCT/CN2021/100977, filed on Jun. 18, 2021, the contents of which are incorporated herein in their entirety by reference.

TECHNICAL FIELD

The present disclosure relates to the field of data transmission technologies, and in particular, to a video image capture terminal, a video image transmission method, a video image transmission system, a computer-readable storage medium, an electronic device, and a video playing system.

BACKGROUND

In a process of playing an online video, a video image capture terminal pushes captured video images to a cloud server, and a client acquires the video images from the cloud server to play. Thus, real-time display of the video images captured by the video image capture terminal on the client can be realized.

SUMMARY

In one aspect, the present disclosure provides a video image transmission method, including:
    capturing video images by a video image capture terminal, and uploading the video images to a cloud server by the video image capture terminal in real time;
    acquiring first speed information of uploading the video images by the video image capture terminal and second speed information of receiving the video images by the cloud server;
    determining, according to the first speed information, the second speed information and a current ratio n of a first frame rate at which the video image capture terminal captures the video images to a second frame rate at which the video image capture terminal uploads the video images, a target ratio m of the first frame rate to the second frame rate, where the target ratio m and the current ratio n are both positive integers; and
    adjusting, according to the target ratio m, a speed at which the video image capture terminal uploads the video images, so as to match an adjusted speed at which the video image capture terminal uploads the video images with a speed at which the cloud server receives the video images.

In an embodiment of the present disclosure, adjusting, according to the target ratio m of the first frame rate to the second frame rate, the speed at which the video image capture terminal uploads the video images includes: every time the video image capture terminal captures m frames of video images, allowing the video image capture terminal to upload one of the m frames of video images.

In an embodiment of the present disclosure, the first speed information includes: a bit rate at which the video image capture terminal uploads the video images, and the second speed information includes: a bit rate at which the cloud server receives the video images; and
    in response to the bit rate at which the video image capture terminal uploads the video images being greater than the bit rate at which the cloud server receives the video images, the target ratio m is set to be greater than the current ratio n; and in response to the bit rate at which the video image capture terminal uploads the video images being smaller than the bit rate at which the cloud server receives the video images, the target ratio m is set to be smaller than the current ratio n.

In an embodiment of the present disclosure, determining, according to the first speed information, the second speed information and the current ratio n of the first frame rate at which the video image capture terminal captures the video images and the second frame rate at which the video image capture terminal uploads the video images, the target ratio m of the first frame rate to the second frame rate includes:
    determining a ratio x of the bit rate at which the video image capture terminal uploads the video images to the bit rate at which the cloud server receives the video images; and
    determining the target ratio m according to a reference frame rate range and a product of the ratio x and the current ratio n.

In an embodiment of the present disclosure, determining the target ratio m according to the reference frame rate range and the product of the ratio x and the current ratio n includes:
    determining an adjusted ratio of the first frame rate to the second frame rate according to the ratio x and the current ratio n, where the adjusted ratio is a value obtained by rounding the product of the ratio x and the current ratio n;
    determining an adjusted second frame rate according to the first frame rate and the adjusted ratio; and
    comparing the adjusted second frame rate with the reference frame rate range; taking the adjusted ratio as the target ratio m in response to the adjusted second frame rate being within the reference frame rate range; and determining the target ratio m according to a boundary value of the reference frame rate range in response to the adjusted second frame rate being out of the reference frame rate range.

In an embodiment of the present disclosure, a minimum value of the reference frame rate range is between 14 frames/second and 20 frames/second.

In an embodiment of the present disclosure, the video image transmission method further includes:
    receiving, by the cloud server, the video images uploaded by the video image capture terminal;
    determining the second speed information according to a data volume of the video images received by the cloud server per unit of time; and
    sending the second speed information to the video image capture terminal.

In another aspect, the present disclosure further provides a video image capture terminal, including:
    a capturing device configured to capture video images;
    an uploading device configured to upload the video images captured by the capturing device to a cloud server in real time;
    a processing device configured to:
        acquire first speed information of uploading the video images by the uploading device and second speed information of receiving the video images by the cloud server, and
        determine, according to the first speed information, the second speed information and a current ratio n of a first frame rate at which the capturing device captures the video images to a second frame rate at which the uploading device uploads the video images, a target ratio m of the first frame rate to the second frame rate, where the target ratio m and the current ratio n are both positive integers; and an adjusting device configured to adjust, according to the target ratio m, a speed at which the uploading device uploads the video images, so as to match an adjusted speed at which the uploading device uploads the video images with a speed at which the cloud server receives the video images.

In an embodiment of the present disclosure, the adjusting device is configured to adjust the speed at which the uploading device uploads the video images, such that every time the capturing device captures m frames of video images, the uploading device uploads one of the m frames of video images.

In an embodiment of the present disclosure, the first speed information includes: a bit rate at which the uploading device uploads the video images, and the second speed information includes: a bit rate at which the cloud server receives the video images; and the processor device is configured to set the target ratio m to be greater than the current ratio n in response to the bit rate at which the uploading device uploads the video images being greater than the bit rate at which the cloud server receives the video images, and set the target ratio m to be smaller than the current ratio n in response to the bit rate at which the uploading device uploads the video images being smaller than the bit rate at which the cloud server receives the video images.

In an embodiment of the present disclosure, the processing device is configured to:

determine a ratio x of the bit rate at which the uploading device uploads the video images to the bit rate at which the cloud server receives the video images, and determine the target ratio m according to a reference frame rate range and a product of the ratio x and the current ratio n.

In an embodiment of the present disclosure, the processing device is configured to:

determine an adjusted ratio of the first frame rate to the second frame rate according to the ratio x and the current ratio n, where the adjusted ratio is a value obtained by rounding the product of the ratio x and the current ratio n, determine an adjusted second frame rate according to the first frame rate and the adjusted ratio, and compare the adjusted second frame rate with the reference frame rate range; take the adjusted ratio as the target ratio m in response to the adjusted second frame rate being within the reference frame rate range, and determine the target ratio m according to a boundary value of the reference frame rate range in response to the adjusted second frame rate being out of the reference frame rate range.

In an embodiment of the present disclosure, the adjusting device adjusts the speed at which the uploading device uploads the video images in real time.

In another aspect, the present disclosure further provides a video transmission system, including:

the video image capture terminal according to the present disclosure; and a cloud server configured to:

receive the video images uploaded by the video image capture terminal;

determine the second speed information according to a data volume of the video images received per unit of time; and send the second speed information to the video image capture terminal.

In another aspect, the present disclosure further provides a computer-readable storage medium storing a computer program which, when executed by a processor, implements the video image transmission method according to the present disclosure.

In another aspect, the present disclosure further provides an electronic device, including:

a processor and a memory;

the memory stores a computer program which, when executed by the processor, implements the video image transmission method according to the present disclosure.

In another aspect, the present disclosure further provides a video playing system, including:

the video transmission system according to the present disclosure; and a video playing terminal configured to acquire video images from the cloud server and play the video images.

BRIEF DESCRIPTION OF DRAWINGS

The accompanying drawings are intended to provide a further understanding of the present disclosure, and constitute a part of the specification. Together with the following specific embodiments, the drawings are used to explain the present disclosure, and do not constitute any limitation to the present disclosure. In the drawings.

DETAIL DESCRIPTION OF EMBODIMENTS

Specific embodiments of the present disclosure are described in detail below with reference to the drawings. It should be understood that the specific embodiments described herein are merely used to illustrate and explain the present disclosure, rather than limiting the present disclosure.

Unless otherwise defined, technical terms or scientific terms used in the embodiments of the present disclosure should have general meanings as understood by person with ordinary skills in the technical field of the present disclosure. The words "first", "second" and the like used herein do not denote any order, quantity, or importance, but are just used to distinguish between different components.

During live video streaming over the network, a video image capture terminal pushes captured video images to a cloud server, and a client acquires the video images from the cloud server to play, thereby realizing real-time display of the video images captured by the video image capture terminal on the client.

At present, in a process of displaying the video images captured by the video image capture terminal in real time on the client, choppy video may occur at the client due to a poor network, and affects viewing smoothness. In this process, two network speeds are involved: an upload network speed (i.e., an upload speed at which the video image capture terminal uploads the video images to the cloud server) and a download network speed (i.e., a download speed at which the client acquires the video images from the cloud server). Adaptation may be achieved by adjusting video definition at the client. For example, the video definition may be divided into smooth, standard definition, high definition, Blu-ray and the like so that the definition can be automatically selected at the client or manually selected by a user. In this way, the viewing smoothness can be ensured by choosing a relatively low definition of a video for watching when the download network speed is relatively low, and choosing a relatively high definition of the video for watching when the download network speed is relatively high. However, few technical solutions are proposed to improve the video image capture terminal. When the upload network speed is poor, the upload speed of the video image capture terminal is not matched with a receiving speed of the cloud server, which may also cause choppy video played at the client. For example, the video image capture terminal captures 30 frames of video images per second, while the cloud server can only receive 15 frames of video images per second and thus takes 2 seconds to receive 30 frames of video images. As a result, video images received by the cloud server and the client in 2 seconds are actually the video images captured by the video image capture terminal in 1 second, that is, it takes 2 seconds for the client to play the images captured by the video image capture terminal in 1 second, which causes choppy video played at the client.

Figure 1:
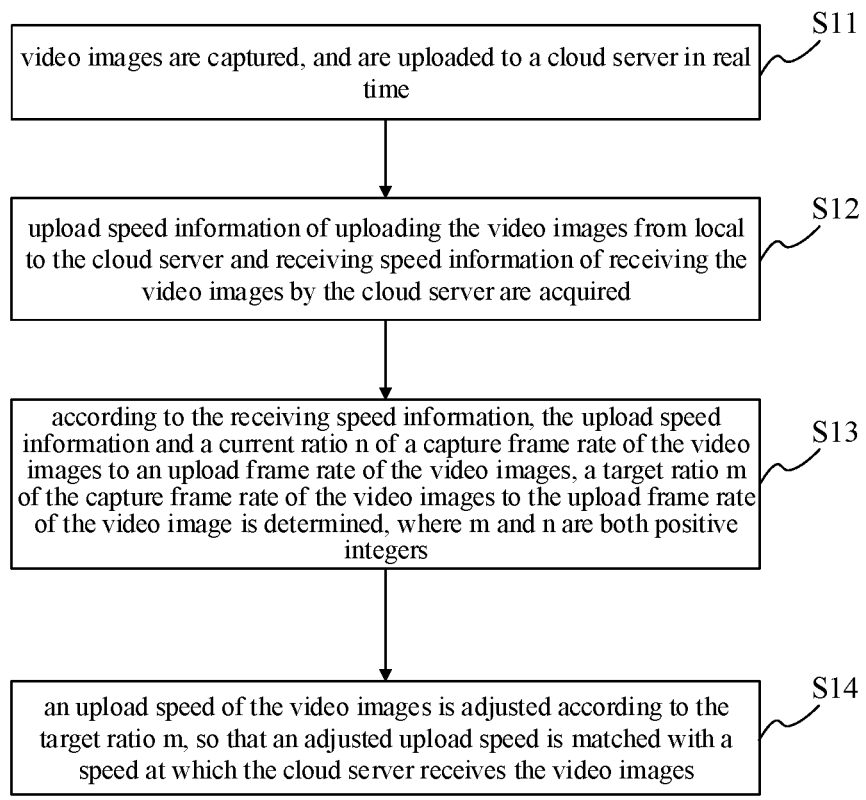
FIG. 1 is a flowchart illustrating a video image uploading method according to the embodiments of the present disclosure.

In view of the above, the present disclosure provides a video image uploading method, which is applied to a video image capture terminal. FIG. 1 is a flowchart illustrating a video image uploading method according to the embodiments of the present disclosure. As shown in FIG. 1, the video image uploading method includes steps S11 to S14.

In step S11, video images are captured, and are uploaded to a cloud server in real time.

In the embodiments of the present disclosure, after capturing the video images, the video image capture terminal can perform processings such as encoding, compressing and the like on the video images, so as to generate video stream data, and then upload the captured video images to the cloud server in the form of the video stream data.

In step S12, upload speed information of uploading the video images from local to the cloud server and receiving speed information of receiving the video images by the cloud server are acquired.

The local herein refers to the video image capture terminal for capturing and uploading the video images, such as a video camera. The upload speed information includes: a data volume of the video images uploaded by the video image capture terminal per unit of time. The receiving speed information includes: a data volume of the video images received by the cloud server per unit of time. The unit of time may be set to 1 second. In the embodiments of the present disclosure, the upload speed information and the receiving speed information are both for one frame of video image or for several frames of video images. However, since the upload speed information of the video images is determined by the local, and the receiving speed information of receiving the video images by the cloud server varies with network conditions (e.g., network congestion), the upload speed information is not necessarily the same as the receiving speed information.

In step S13, according to the receiving speed information, the upload speed information and a current ratio n of a capture frame rate of the video images to an upload frame rate of the video images, a target ratio m of the capture frame rate of the video images to the upload frame rate of the video images is determined, where m and n are both positive integers.

In the embodiments of the present disclosure, the capture frame rate may refer to the number of frames of video images captured by the video image capture terminal per unit of time, and the upload frame rate may refer to the number of frames of video images uploaded by the video image capture terminal to the cloud server per unit of time. In a case where the capture frame rate is a fixed frequency, the greater the ratio of the capture frame rate to the upload frame rate is, the smaller the upload frame rate is, that is, the smaller the number of frames of video images uploaded by the video image capture terminal to the cloud server per unit of time is; the smaller the ratio of the capture frame rate to the upload frame rate is, the greater the upload frame rate is, that is, the greater the number of frames of video images uploaded by the video image capture terminal to the cloud server per unit of time is; and when the ratio of the capture frame rate to the upload frame rate is 1, the video image capture terminal uploads all images captured thereby per unit of time.

In step S14, an upload speed of the video images is adjusted according to the target ratio m, so as to match an adjusted upload speed with a speed at which the cloud server receives the video images.

In the present disclosure, "match an adjusted upload speed with a speed at which the cloud server receives the video images" refers to "make a difference between the adjusted upload speed and the speed at which the cloud server receives the video images as small as possible". For example, the adjusted upload speed may be made equal to the speed at which the cloud server receives the video images. The present disclosure does not impose any specific limitation thereto as long as the difference between the adjusted upload speed and the speed at which the cloud server receives the video images can be made smaller than a difference between the upload speed before adjustment and the speed at which the cloud server receives the video images.

In the embodiments of the present disclosure, every time the video image capture terminal captures m frames of video images, the video image capture terminal uploads one of the m frames of video images. When the video images are uploaded, a video protocol such as Real-Time Messaging Protocol (RTMP) may be adopted for uploading.

It should be noted that m represents the target ratio of the capture frame rate to the upload frame rate, but to determine a value of m, it is not necessarily required to firstly determine a specific value of the capture frame rate and a specific value of the upload frame rate, but it is only required to determine how many frames are captured to upload one frame.

When the target ratio m becomes greater, the number of frames of the uploaded video images among the video images captured by the video image capture terminal becomes smaller. Therefore, in the embodiments of the present disclosure, the number of frames of the video images uploaded by the video image capture terminal per unit of time can be adjusted by controlling a value of the target ratio m, thereby alleviating the choppy video played at the client caused by a mismatch between the receiving speed of the cloud server and the upload speed of the video image capture terminal.

In summary, with the video image uploading method according to the embodiments of the present disclosure, the number of frames of the video images uploaded by the video image capture terminal per unit of time can be reduced, that is, the upload speed of the video image capture terminal can be reduced, when the receiving speed of video images of the cloud server decreases (a network environment deteriorates), so that the receiving speed of the cloud server is matched with the upload speed of the video image capture terminal, thereby avoiding the choppy video played at the client caused by the mismatch between the receiving speed of the cloud server and the upload speed of the video image capture terminal.

It should be noted that, in the embodiments of the present disclosure, step S11 is performed continuously, and steps S12 to S14 are performed while step S11 is being performed, rather than after step S11 is completed.

In some embodiments, step S14 includes: uploading one frame of video image every other (m−1) frames of video images.

For example, in a case where the video image capture terminal captures 30 frames of video images in 1 second, if the target ratio of the capture frame rate to the upload frame rate is 2, the video image capture terminal uploads one frame of video image every other one frame of video image, and the video image capture terminal uploads 15 frames of video images in 1 second; and if the target ratio of the capture frame rate to the upload frame rate is 3, the video image capture terminal uploads one frame of video image every other two frames of video images, and at this time, the video image capture terminal uploads 10 frames of video images in 1 second.

It should be further noted that the number of frames of the video images captured by the video image capture terminal in 1 second is only for exemplary illustration, and the video image capture terminal may also capture 60 frames of video images, 120 frames of video images, 240 frames of video images, 330 frames of video images or even more frames of video images in 1 second, which may be determined according to actual needs, and is not limited herein.

Figure 2:
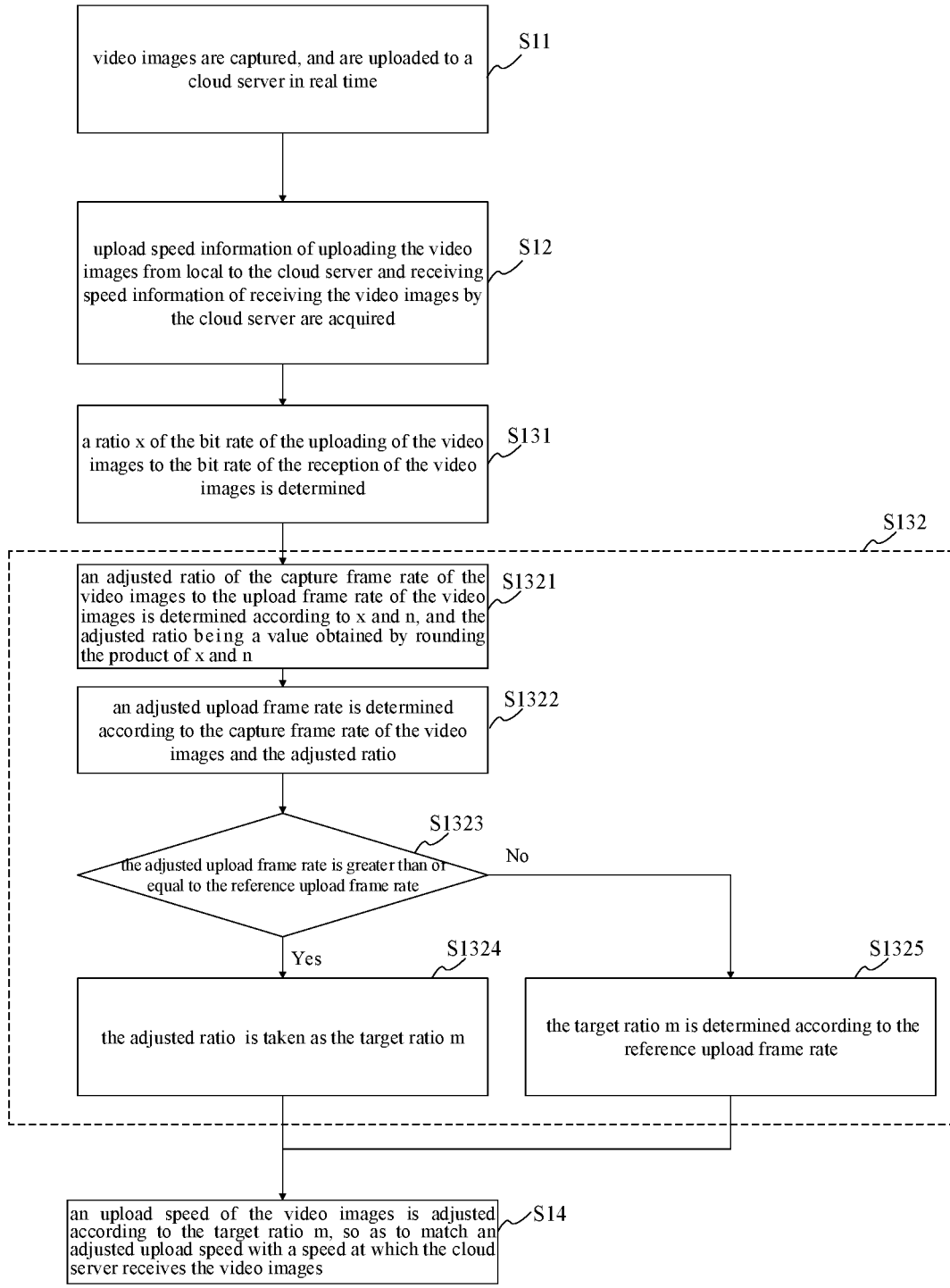
FIG. 2 is a flowchart illustrating a video image uploading method according to the embodiments of the present disclosure.

FIG. 2 is a flowchart of a video image uploading method according to the embodiments of the present disclosure. The video image uploading method according to the embodiments of the present disclosure is described in detail below with reference to FIG. 2. In some embodiments, the upload speed information includes: a bit rate of uploading of the video images; and the receiving speed information includes: a bit rate of reception of the video images by the cloud server. As described above, the video images are uploaded in the form of the video stream data, the bit rate here refers to the number of data bits that are conveyed per unit of time in data transmission, and a unit of the bit rate is kbps, i.e., kilobits per second. The greater the bit rate, the higher the accuracy.

When the bit rate of the uploading of the video images is greater than the bit rate of the reception of the video images, a value of the current ratio n is increased to obtain the target ratio m, that is, the target ratio m is set to be greater than the current ratio n. When the bit rate of the uploading of the video images is smaller than the bit rate of the reception of the video images, the value of the current ratio n is reduced to obtain the target ratio m, that is, the target ratio m is set to be smaller than the current ratio n.

In the embodiments of the present disclosure, the receiving speed information is determined by the cloud server. For example, the cloud server may determine a network condition according to network data of network ports, and then determine the bit rate of the reception of the video images according to the network condition. The bit rate of the reception of the video images is relatively large under a good network condition; and the bit rate of the reception of the video images is relatively small under a poor network condition. When the bit rate of the uploading of the video images is greater than the bit rate of the reception of the video images, the network environment is poor, and the video images uploaded by the video image capture terminal cannot be received by the cloud server in time. At this time, the target ratio m is set to be greater than the current ratio n, so as to reduce the number of frames of the video images uploaded by the video image capture terminal per unit of time, thereby avoiding the choppy video played at the client. When the bit rate of the uploading of the video images is smaller than the bit rate of the reception of the video images, the network environment is good, the video images uploaded by the video image capture terminal can be received by the cloud server in time, and the cloud server can receive more video images per unit of time. At this time, the target ratio m is set to be smaller than the current ratio n, so as to increase the number of frames of the video images uploaded by the video image capture terminal per unit of time, thereby improving definition of a video played at the client.

By taking a case where a current bit rate of the uploading of the video images by the video image capture terminal is greater than a current bit rate of the reception of the video images by the cloud server as an example, it is assumed that the video image capture terminal captures 30 frames of video images per second, and currently uploads 30 frames of video images per second. In this case, the current ratio n of the capture frame rate to the upload frame rate of the video image capture terminal is 1. The video image capture terminal detects that the bit rate of the uploading of the video images is 6000000 kbps, the cloud server detects that the bit rate of the reception of the video images is 3000000 kbps, the cloud server sends the detected bit rate of the reception of the video images to the video image capture terminal, and the video image capture terminal determines that the bit rate of the uploading of the video images is much greater than the bit rate of the reception of the video images after comparing the bit rate of the uploading of the video images with the bit rate of the reception of the video images. At this time, the target ratio m may be set to be greater than the current ratio n, that is, the target ratio m is set to be greater than 1 (for example, m may be 2, 3, or 4 . . . ), so as to allow the video image capture terminal to upload one frame of video image every other at least one frame of video image, thus reducing the number of frames of the video images uploaded by the video image capture terminal per unit of time. As a result, the bit rate of the uploading of the video images by the video image capture terminal is identical or almost identical to the bit rate of the reception of the video images by the cloud server, thereby avoiding the choppy video played at the client.

In some embodiments, as shown in FIG. 2, step S13 includes steps S131 and S132.

In step S131, a ratio x of the bit rate of the uploading of the video images to the bit rate of the reception of the video images is determined.

In step S132, the target ratio m is determined according to a reference upload frame rate and a product of the ratio x and the current ratio n.

In the embodiments of the present disclosure, the reference upload frame rate may include: a minimal upload frame number and/or a maximal upload frame number of the video image capture terminal per unit of time. In the embodiments of the present disclosure, the reference upload frame rate is provided to prevent the target ratio m from being too large or too small, so as to further prevent an upload frame number of the video image capture terminal per unit of time from being too small or too large, and avoid affecting a display effect of the client.

In some embodiments, in a case where the reference upload frame rate is the minimal upload frame number of the video image capture terminal per unit of time, step S132 includes steps S1321 to S1325.

In step S1321, an adjusted ratio n' of the capture frame rate of the video images to the upload frame rate of the video images is determined according to the ratio x and the current ratio n, where the adjusted ratio n' is a value obtained by rounding the product of the ratio x and the current ratio n. Illustratively, "rounding" performed in the embodiments of the present disclosure is rounding down.

In step S1322, an adjusted upload frame rate is determined according to the capture frame rate of the video images and the adjusted ratio.

In step S1323, the adjusted upload frame rate is compared with the reference upload frame rate; step S1324 is performed if the adjusted upload frame rate is greater than or equal to the reference upload frame rate, and step S1325 is performed if the adjusted upload frame rate is smaller than the reference upload frame rate.

In step S1324, the value (i.e., the adjusted ratio) obtained by rounding the product of the ratio x and the current ratio n is taken as the target ratio m.

In step S1325, the target ratio m is determined according to the reference upload frame rate.

In some embodiments, the reference upload frame rate is between 14 frames/second and 20 frames/second. For example, the reference upload frame rate may be set to 15 frames/second or 16 frames/second.

By taking a case where the reference upload frame rate is the minimal upload frame number of the video image capture terminal per unit of time as an example, it is assumed that the reference upload frame rate is 15 frames/second, and the video image capture terminal captures 30 frames of video images per second, and currently uploads 30 frames of video images per second. In this case, the current ratio n of the capture frame rate to the upload frame rate of the video image capture terminal is 1. The bit rate of the uploading of the video images detected by the video image capture terminal is 6000000 kbps, and the bit rate of the reception of the video images detected by the cloud server is 2000000 kbps. The cloud server sends the detected bit rate of the reception of the video images to the video image capture terminal, and the video image capture terminal obtains x=3 by calculation according to the bit rate of the uploading of the video images and the bit rate of the reception of the video images. Then, the video image capture terminal multiplies x and n and rounds the obtained product to obtain that the adjusted ratio n' of the capture frame rate to the upload frame rate satisfies n'=3, and a ratio of the capture frame rate to the adjusted ratio n' is the adjusted upload frame rate a which satisfies a=10 frames/second. At this time, since the adjusted upload frame rate is smaller than the reference upload frame rate (15 frames/second), a value obtained by rounding a ratio of the capture frame rate to the reference upload frame rate is taken as the target ratio m, and at this time, m=2. In such a case, the video image capture terminal uploads one frame of video image every other one frame of video image, the number of frames of the video images uploaded by the video image capture terminal in 1 second is reduced from 30 frames to 15 frames, and the bit rate of the uploading of the video images by the video image capture terminal is reduced from 6000000 kbps to 3000000 kbps, which is close to the bit rate of the reception of the video images by the cloud server.

The cloud server may send the detected bit rate of the reception of the video images to the video image capture terminal regularly, so that the video image capture terminal may adjust the number of frames of the video images uploaded per unit of time in real time. For example, after the video image capture terminal makes the adjustment as described above, the video image capture terminal receives the bit rate of the reception of the video images sent by the cloud server again. Assuming that the network environment becomes better, the bit rate of the reception of the video images detected by the cloud server is 6000000 kbps, at this time, the bit rate of the uploading of the video images, which is obtained after the previous adjustment, is 3000000 kbps, the upload frame rate is 15 frames/second, the capture frame rate keeps unchanged, that is, the capture frame rate is still 30 frames/second, and the current ratio n of the capture frame rate to the upload frame rate of the video image capture terminal is 2. The video image capture terminal obtains x=½ by calculation according to the bit rate of the uploading of the video images and the bit rate of the reception of the video images. Then, the video image capture terminal multiplies x and n and rounds the obtained product to obtain that the adjusted ratio n' of the capture frame rate to the upload frame rate satisfies n'=1, and the ratio of the capture frame rate to the adjusted ratio n' is the adjusted upload frame rate a which satisfies a=30. At this time, since the adjusted upload frame rate is greater than the reference upload frame rate, the adjusted ratio n' is taken as the target ratio m, at this time, m=1, the video image capture terminal uploads one frame of video image every other 0 frame of video image, the number of frames of the video images uploaded by the video image capture terminal in 1 second is increased from 15 frames to 30 frames, and the bit rate of the uploading of the video images by the video image capture terminal is increased from 3000000 kbps to 6000000 kbps, which is the same as the bit rate of the reception of the video images by the cloud server.

It should be noted that, in the embodiments of the present disclosure, the above way of determining the target ratio m is only an exemplary implementation, and the target ratio m may also be determined in other ways in some other embodiments, as long as m>n when the bit rate of the uploading of the video images is greater than the bit rate of the reception of the video images, and m<n when the bit rate of the uploading of the video images is smaller than the bit rate of the reception of the video images.

Figure 3:
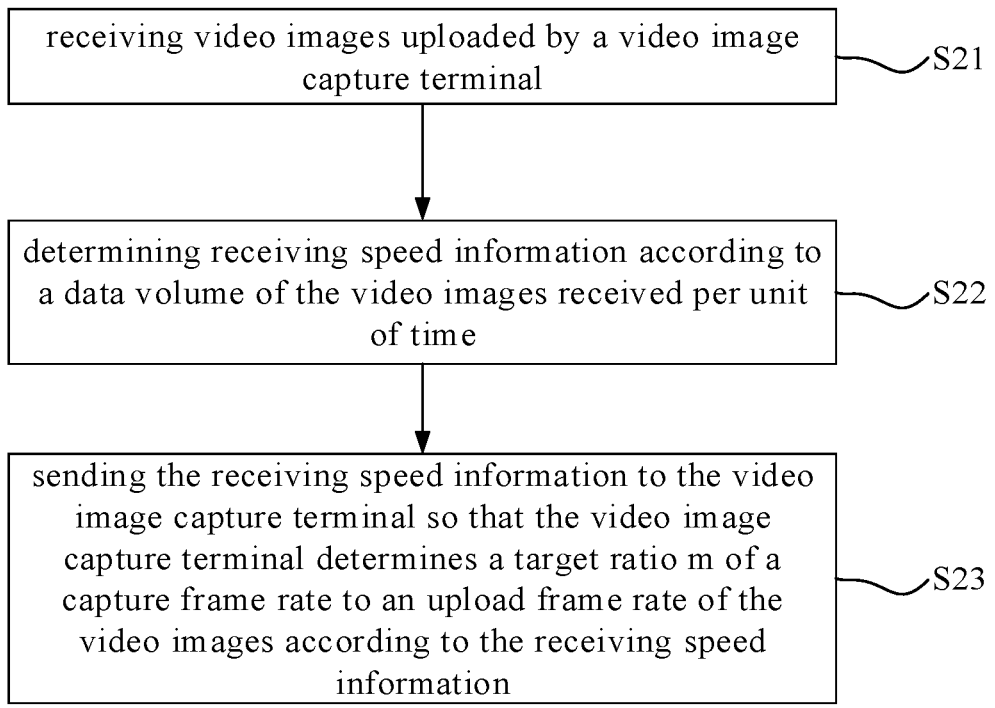
FIG. 3 is a flowchart illustrating a method for monitoring a video image receiving speed according to the embodiments of the present disclosure.

The present disclosure further provides a method for monitoring a video image receiving speed, which is applied to the cloud server. FIG. 3 is a flowchart illustrating a method for monitoring a video image receiving speed according to the embodiments of the present disclosure. As shown in FIG. 3, the method includes steps S21 to S23. Step S21 includes receiving video images uploaded by a video image capture terminal. Step S22 includes determining receiving speed information according to a data volume of the video images received per unit of time.

Step S23 includes sending the receiving speed information to the video image capture terminal so that the video image capture terminal determines a target ratio m of a capture frame rate of the video images and an upload frame rate of the video images according to the receiving speed information. For example, the cloud server may send the receiving speed information to the video image capture terminal through a communication protocol such as User Datagram Protocol (UDP) or Transmission Control Protocol (TCP).

In the embodiments of the present disclosure, the receiving speed information may include a bit rate of reception of the video images. The cloud server may monitor the bit rate of the reception of the video images in real time, and send the bit rate to the video image capture terminal as the receiving speed information at a preset period (for example, 10 minutes, 30 minutes, 1 hour, or other time).

With the method for monitoring a video image receiving speed according to the embodiments of the present disclosure, the detected receiving speed information can be sent to the video image capture terminal to allow the video image capture terminal to determine the target ratio m of the capture frame rate of the video images to the upload frame rate of the video images according to the receiving speed information, so that a receiving speed of the cloud server can be matched with a local upload speed, thereby avoiding the choppy video played at a client caused by a mismatch between the receiving speed of the cloud server and the local upload speed.

Figure 4:
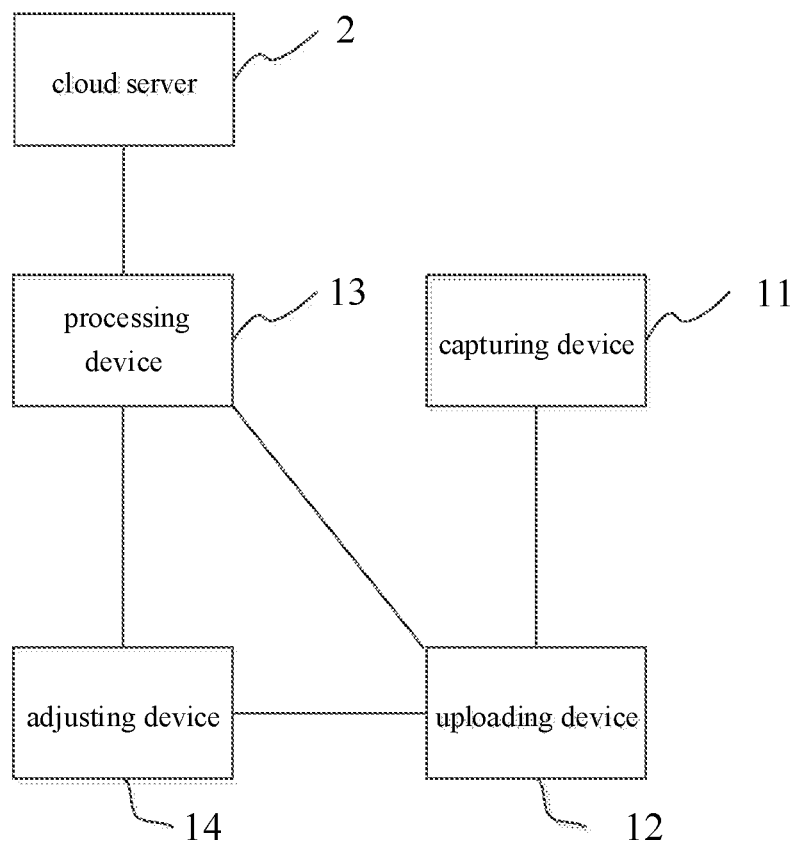
FIG. 4 is a schematic diagram of functional modules of a video image capture terminal according to the embodiments of the present disclosure.

The present disclosure further provides a video image capture terminal, and FIG. 4 is a block diagram of a video image capture terminal according to the embodiments of the present disclosure. As shown in FIG. 4, the video image capture terminal includes a capturing device 11, an uploading device 12, a processing device 13, and an adjusting device 14.

The capturing device 11 is configured to capture video images. In some embodiments, the capturing device 11 may be a camera.

The uploading device 12 is configured to upload the video images captured by the capturing device 11 to a cloud server in real time.

The processing device 13 is configured to acquire upload speed information of uploading video data by the uploading device 12 to the cloud server and receiving speed information of receiving the video images by the cloud server 2, and determine, according to the receiving speed information, the upload speed information and a current ratio n of a capture frame rate of the video images to an upload frame rate of the video images, a target ratio m of the capture frame rate of the video images to the upload frame rate of the video images, where m and n are both positive integers.

The adjusting device 14 is configured to adjust, according to the target ratio m, a speed at which the uploading device 12 uploads the video images, so as to match an adjusted speed at which the uploading device 12 uploads the video images with a speed at which the cloud server receives the video images.

In the embodiments of the present disclosure, the adjusting device 14 is configured to adjust the speed at which the uploading device 12 uploads the video images such that every time the capturing device 11 captures m frames of video images, the uploading device 12 uploads one of the m frames of video images.

In the embodiments of the present disclosure, the upload speed information includes: a data volume of video images uploaded by the video image capture terminal per unit of time; and the receiving speed information includes: a data volume of the video images received by the cloud server per unit of time. In the present disclosure, the unit of time may be set to 1 second. The capture frame rate may refer to the number of frames of video images captured by the video image capture terminal per unit of time, and the upload frame rate may refer to the number of frames of video images uploaded by the video image capture terminal to the cloud server per unit of time. In a case where the capture frame rate is a fixed frequency, the greater the ratio of the capture frame rate to the upload frame rate is, the smaller the upload frame rate is, that is, the smaller the number of frames of video images uploaded by the video image capture terminal to the cloud server per unit of time is; the smaller the ratio of the capture frame rate to the upload frame rate is, the greater the upload frame rate is, that is, the greater the number of frames of video images uploaded by the video image capture terminal to the cloud server per unit of time is; and when the ratio of the capture frame rate to the upload frame rate is 1, the video image capture terminal uploads all images captured thereby per unit of time. When the target ratio m becomes greater, m−1 also becomes greater, and the number of frames between two adjacent to-be-uploaded frames among the video images captured by the video image capture terminal becomes larger; and when the target ratio m becomes smaller, m−1 also becomes smaller, and the number of frames between two adjacent to-be-uploaded frames among the video images captured by the video image capture terminal becomes smaller. Therefore, in the embodiments of the present disclosure, by controlling the value of the target ratio m, the number of frames between two adjacent to-be-uploaded frames among the video images captured by the video image capture terminal can be controlled, so that the number of frames of video images uploaded by the video image capture terminal per unit of time can be controlled.

In summary, by using the video image capture terminal according to the embodiments of the present disclosure, the number of frames of video images uploaded by the video image capture terminal per unit of time can be reduced, that is, an upload speed of the video image capture terminal can be reduced, when a receiving speed of video images of the cloud server decreases (a network environment deteriorates), so that the receiving speed of the cloud server is matched with the upload speed of the video image capture terminal, thereby avoiding the choppy video played at a client caused by a mismatch between the receiving speed of the cloud server and the upload speed of the video image capture terminal.

Figure 5:
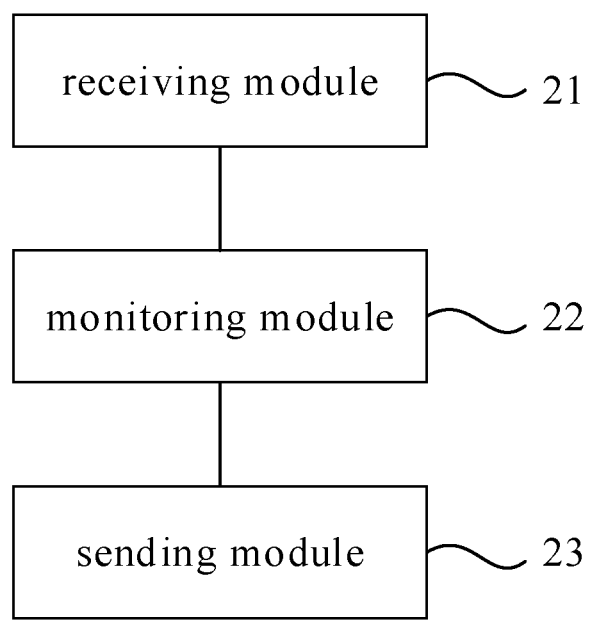
FIG. 5 is a schematic diagram of functional modules of a cloud server according to the embodiments of the present disclosure.

The present disclosure further provides a cloud server, and FIG. 5 is a block diagram of a cloud server according to the embodiments of the present disclosure. As shown in FIG. 5, the cloud server includes:
  a receiving module 21 configured to receive video images uploaded by a video image capture terminal;
  a monitoring module 22 configured to determine receiving speed information according to a data volume of the video images received per unit of time; and
  a sending module 23 configured to send the receiving speed information to the video image capture terminal so that the video image capture terminal determines a target ratio m of a capture frame rate of the video images to an upload frame rate of the video images according to the receiving speed information.

In the embodiments of the present disclosure, the receiving speed information may include a bit rate of reception of the video images, and the cloud server may monitor the bit rate of the reception of the video images in real time and send the bit rate to the video image capture terminal as the receiving speed information at a preset period.

By using the cloud server according to the embodiments of the present disclosure, the detected receiving speed information can be sent to the video image capture terminal to allow the video image capture terminal to determine the target ratio m of the capture frame rate of the video images to the upload frame rate of the video images according to the receiving speed information, so that a receiving speed of the cloud server can be matched with a local upload speed, thereby avoiding the choppy video displayed at a client caused by a mismatch between the receiving speed of the cloud server and the local upload speed.

The present disclosure further provides a computer-readable storage medium having a computer program stored thereon, and the computer program implements, when executed by a processor, the above video image uploading method or the above method for monitoring a video image receiving speed.

The computer-readable storage medium herein includes volatile/nonvolatile and removable/non-removable media used in any method or technology for storing information (such as computer-readable instructions, data structures, program modules and other data). The computer-readable storage medium includes, but is not limited to, a Random Access Memory (RAM), a Read-Only Memory (ROM), an Electrically Erasable Programmable Read-Only Memory (EEPROM), a flash memory or other storage technologies, a Compact Disc Read-Only Memory (CD-ROM), a Digital Versatile Disc (DVD) or other optical disc storage, a magnetic cassette, a magnetic tape, a magnetic disk or other magnetic storage medium, or any other medium which can be used to store desired information and can be accessed by a computer.

The present disclosure further provides an electronic device, including: a processor and a memory.

The memory has a computer program stored thereon. The computer program implements, when executed by a processor, the above video image uploading method or the above method for monitoring a video image receiving speed.

The embodiments of the present disclosure further provide a video playing system, including: the above video image capture terminal, the above cloud server and a video playing terminal. The video playing terminal is configured to acquire video images from the cloud server and play the video images, so that the video images captured by the video image capture terminal can be displayed in real time on the video playing terminal.

It should be understood that the above embodiments are merely exemplary embodiments adopted to illustrate the principle of the present disclosure, and the present disclosure is not limited thereto. Various modifications and improvements can be made by those of ordinary sill in the art without departing from the spirit and essence of the present disclosure, and those modifications and improvements are also considered to fall within the scope of the present disclosure.

What is claimed is:

1. A video image transmission method, comprising:
capturing video images by a video image capture terminal, and uploading the video images to a cloud server by the video image capture terminal in real time;
acquiring first speed information of uploading the video images by the video image capture terminal and second speed information of receiving the video images by the cloud server;
determining, according to the first speed information, the second speed information and a current ratio n of a first frame rate at which the video image capture terminal captures the video images to a second frame rate at which the video image capture terminal uploads the video images, a target ratio m of the first frame rate to the second frame rate, wherein the target ratio m and the current ratio n are both positive integers; and
adjusting, according to the target ratio m, a speed at which the video image capture terminal uploads the video images, so as to match an adjusted speed at which the video image capture terminal uploads the video images with a speed at which the cloud server receives the video images.

2. The video image transmission method of claim 1, wherein adjusting, according to the target ratio m of the first frame rate to the second frame rate, the speed at which the video image capture terminal uploads the video images comprises: every time the video image capture terminal captures m frames of video images, allowing the video image capture terminal to upload one of the m frames of video images.

3. The video image transmission method of claim 1, wherein the first speed information comprises: a bit rate at which the video image capture terminal uploads the video images, and the second speed information comprises: a bit rate at which the cloud server receives the video images; and
in response to the bit rate at which the video image capture terminal uploads the video images being greater than the bit rate at which the cloud server receives the video images, the target ratio m is set to be greater than the current ratio n; and in response to the bit rate at which the video image capture terminal uploads the video images being smaller than the bit rate at which the cloud server receives the video images, the target ratio m is set to be smaller than the current ratio n.

4. The video image transmission method of claim 3, wherein determining, according to the first speed information, the second speed information and the current ratio n of the first frame rate at which the video image capture terminal captures the video images and the second frame rate at which the video image capture terminal uploads the video images, the target ratio m of the first frame rate to the second frame rate comprises:
determining a ratio x of the bit rate at which the video image capture terminal uploads the video images to the bit rate at which the cloud server receives the video images; and
determining the target ratio m according to a reference frame rate range and a product of the ratio x and the current ratio n.

5. The video image transmission method of claim 4, wherein determining the target ratio m according to the reference frame rate range and the product of the ratio x and the current ratio n comprises:
determining an adjusted ratio of the first frame rate to the second frame rate according to the ratio x and the current ratio n, wherein the adjusted ratio is a value obtained by rounding the product of the ratio x and the current ratio n;
determining an adjusted second frame rate according to the first frame rate and the adjusted ratio; and
comparing the adjusted second frame rate with the reference frame rate range; taking the adjusted ratio as the target ratio m in response to the adjusted second frame rate being within the reference frame rate range; and determining the target ratio m according to a boundary value of the reference frame rate range in response to the adjusted second frame rate being out of the reference frame rate range.

6. The video image transmission method of claim 5, wherein a minimum value of the reference frame rate range is between 14 frames/second and 20 frames/second.

7. The video image transmission method of claim 1, further comprising:
receiving, by the cloud server, the video images uploaded by the video image capture terminal;
determining the second speed information according to a data volume of the video images received by the cloud server per unit of time; and
sending the second speed information to the video image capture terminal.

8. A video image capture terminal, comprising:
a capturing device configured to capture video images;
an uploading device configured to upload the video images captured by the capturing device to a cloud server in real time;
a processing device configured to:
acquire first speed information of uploading the video images by the uploading device and second speed information of receiving the video images by the cloud server, and
determine, according to the first speed information, the second speed information and a current ratio n of a first frame rate at which the capturing device captures the video images to a second frame rate at which the uploading device uploads the video images, a target ratio m of the first frame rate to the second frame rate, wherein the target ratio m and the current ratio n are both positive integers; and
an adjusting device configured to adjust, according to the target ratio m, a speed at which the uploading device uploads the video images, so as to match an adjusted speed at which the uploading device uploads the video images with a speed at which the cloud server receives the video images.

9. The video image capture terminal of claim 8, wherein the adjusting device is configured to adjust the speed at which the uploading device uploads the video images, such that every time the capturing device captures m frames of video images, the uploading device uploads one of the m frames of video images.

10. The video image capture terminal of claim 8, wherein the first speed information comprises: a bit rate at which the uploading device uploads the video images, and the second speed information comprises: a bit rate at which the cloud server receives the video images; and
the processor device is configured to set the target ratio m to be greater than the current ratio n in response to the bit rate at which the uploading device uploads the video images being greater than the bit rate at which the cloud server receives the video images, and set the target ratio m to be smaller than the current ratio n in response to the bit rate at which the uploading device uploads the video images being smaller than the bit rate at which the cloud server receives the video images.

11. The video image capture terminal of claim 10, wherein the processing device is configured to:
determine a ratio x of the bit rate at which the uploading device uploads the video images to the bit rate at which the cloud server receives the video images, and
determine the target ratio m according to a reference frame rate range and a product of the ratio x and the current ratio n.

12. The video image capture terminal of claim 11, wherein the processing device is configured to:
determine an adjusted ratio of the first frame rate to the second frame rate according to the ratio x and the current ratio n, wherein the adjusted ratio is a value obtained by rounding the product of the ratio x and the current ratio n,
determine an adjusted second frame rate according to the first frame rate and the adjusted ratio, and
compare the adjusted second frame rate with the reference frame rate range; take the adjusted ratio as the target ratio m in response to the adjusted second frame rate being within the reference frame rate range, and determine the target ratio m according to a boundary value of the reference frame rate range in response to the adjusted second frame rate being out of the reference frame rate range.

13. The video image capture terminal of claim 8, wherein the adjusting device adjusts the speed at which the uploading device uploads the video images in real time.

14. A video transmission system, comprising:
the video image capture terminal of claim 8; and
a cloud server configured to:
receive the video images uploaded by the video image capture terminal;
determine the second speed information according to a data volume of the video images received per unit of time; and
send the second speed information to the video image capture terminal.

15. A non-transitory computer-readable storage medium storing a computer program which, when executed by a processor, implements the video image transmission method of claim 1.

16. An electronic device, comprising:
a processor and a memory;
wherein the memory stores a computer program which, when executed by the processor, implements the video image transmission method of claim 1.

17. A video playing system, comprising:
the video transmission system of claim 14; and
a video playing terminal configured to acquire video images from the cloud server and play the video images.

18. The video transmission system of claim 14, wherein the adjusting device is configured to adjust the speed at which the uploading device uploads the video images, such that every time the capturing device captures m frames of video images, the uploading device uploads one of the m frames of video images.

19. The video transmission system of claim 14, wherein the first speed information comprises: a bit rate at which the uploading device uploads the video images, and the second speed information comprises: a bit rate at which the cloud server receives the video images; and
the processor device is configured to set the target ratio m to be greater than the current ratio n in response to the bit rate at which the uploading device uploads the video images being greater than the bit rate at which the cloud server receives the video images, and set the target ratio m to be smaller than the current ratio n in response to the bit rate at which the uploading device uploads the video images being smaller than the bit rate at which the cloud server receives the video images.

20. The video transmission system of claim 14, wherein the adjusting device adjusts the speed at which the uploading device uploads the video images in real time.

\* \* \* \* \*